United States Patent [19]
Fischer

[11] Patent Number: 5,275,435
[45] Date of Patent: Jan. 4, 1994

[54] FOLDED AIR BAG

[75] Inventor: Kurt F. Fischer, Oxford, Mich.

[73] Assignee: TRW Vehicle Safety Systems Inc., Lyndhurst, Ohio

[21] Appl. No.: 925,579

[22] Filed: Aug. 4, 1992

[51] Int. Cl.⁵ .............................................. B60R 21/20
[52] U.S. Cl. ......................... 280/743 R; 280/728 R; 280/730 R; 493/243
[58] Field of Search ................. 280/743, 728, 730; 493/243, 405

[56] References Cited

U.S. PATENT DOCUMENTS

| | | | |
|---|---|---|---|
| 3,748,477 | 7/1973 | Wulbrecht | 280/743 |
| 4,173,356 | 11/1979 | Ross | 280/743 |
| 4,235,453 | 11/1980 | Lawson et al. | 280/743 |
| 4,262,931 | 4/1981 | Strasser et al. | 280/743 X |
| 4,286,954 | 9/1981 | McArthur et al. | 280/743 X |
| 5,022,675 | 6/1991 | Zelenak, Jr. et al. | 280/743 R |

FOREIGN PATENT DOCUMENTS 2030863 12/1971 Fed. Rep. of Germany ...... 280/743
3544704 6/1987 Fed. Rep. of Germany ...... 280/743

*Primary Examiner*—Eric D. Culbreth
*Attorney, Agent, or Firm*—Tarolli, Sundheim & Covell

[57] ABSTRACT

An inflatable air bag for restraining an occupant of a vehicle has a deflated, folded condition and an inflated, unfolded condition. When in the folded condition, the air bag has a plurality of folded portions disposed in a stack adjacent to an inflator assembly. A first folded portion is disposed in an outer portion of the stack furthest from the inflator assembly and closest to the occupant. As the air bag inflates, the first folded portion pivots and moves sideways as it moves outwardly from the stack to contact the vehicle occupant. The first folded portion directs the vehicle occupant off to one side of the inflating air bag, and the remainder of the air bag inflates off to the side of the vehicle occupant. As a result, the vehicle occupant does not receive the full force of the inflating air bag.

5 Claims, 4 Drawing Sheets

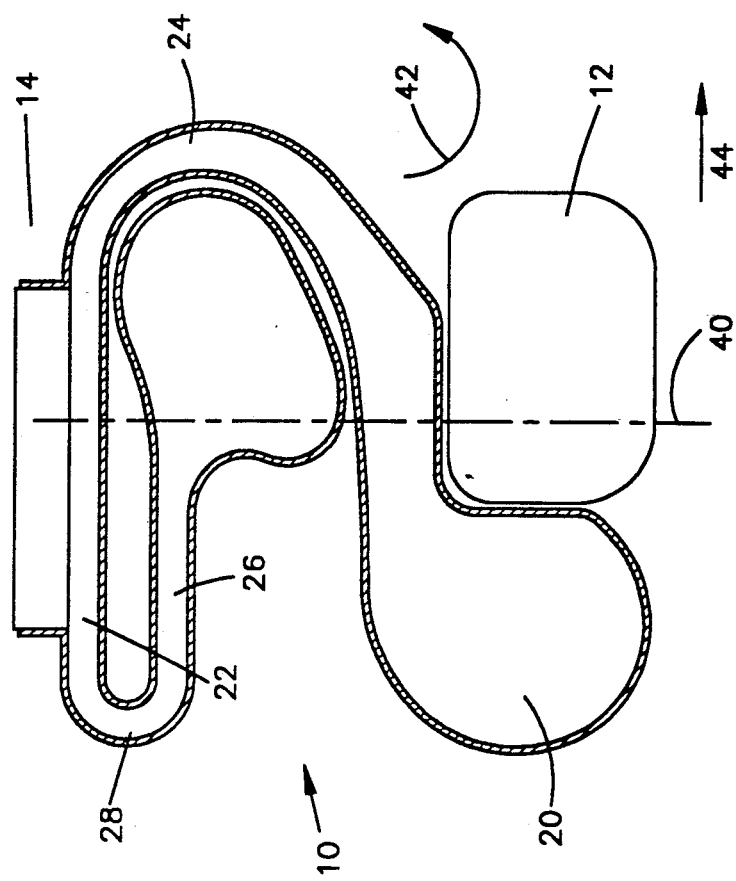
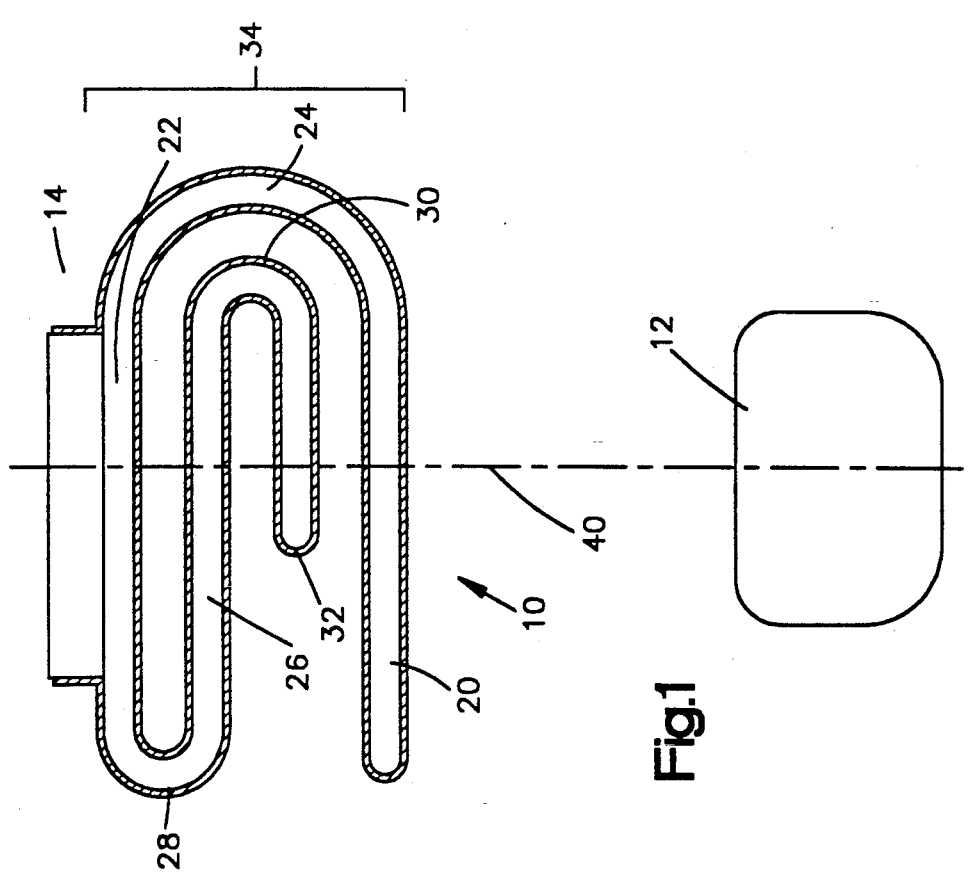

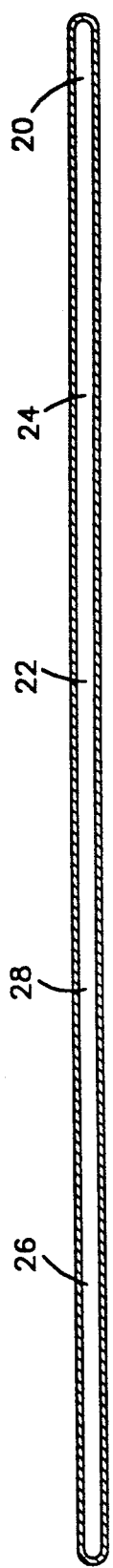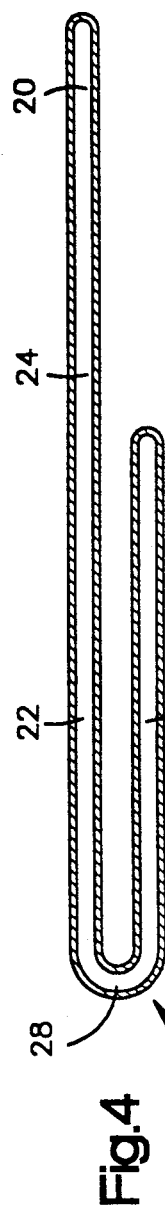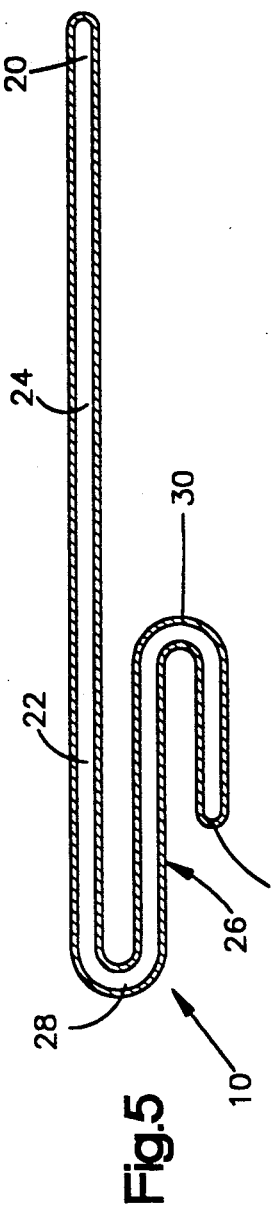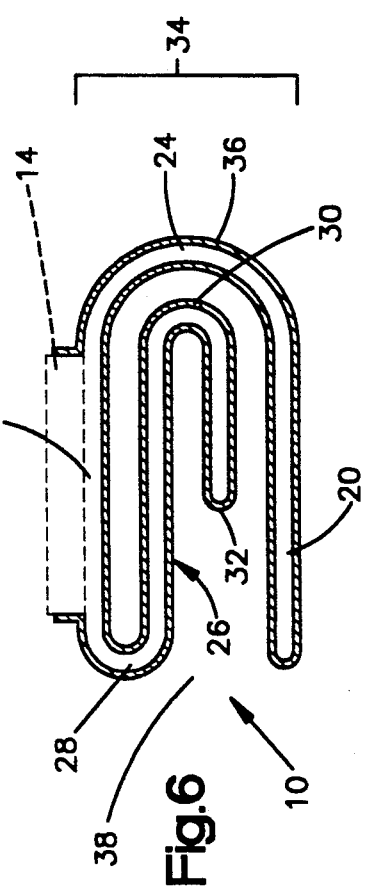

FOLDED AIR BAG

BACKGROUND OF THE INVENTION

1. Technical Field

The present invention relates to an air bag which is inflatable to restrain a occupant of a vehicle during a collision. More particularly, the present invention relates to an air bag for moving an out of position vehicle occupant sideways in the vehicle during inflation of the air bag, prior to full inflation of the air bag.

2. Description of the Prior Art

A vehicle air bag is typically folded and supported in the instrument panel or steering wheel of the vehicle. To restrain a vehicle occupant in the event of sudden vehicle deceleration such as occurs in a collision, an inflator assembly is actuated to direct high pressure gas into the air bag. The air bag unfolds and inflates. The inflated air bag restrains forward movement of the vehicle occupant.

It is preferable that a vehicle occupant be seated in a vehicle seat, close to or against the vehicle seat back, at the time of actuation of the inflator assembly. An air bag is typically designed to inflate rapidly enough to be completely inflated by the time an occupant in this properly seated position moves forward enough to contact the air bag. Thus, the air bag is able to restrain the forward movement of the occupant without itself imparting unnecessary force to the occupant.

However, a vehicle occupant may not be in that ideal position at the time of actuation of the inflator assembly, i.e., may be an "out of position" occupant. For example, a passenger side air bag is typically folded and stored in the instrument panel on the passenger side of the vehicle. A child standing near the instrument panel on the passenger side of the vehicle may be injured by an inflating passenger side air bag. Specifically, the child may be so close to the air bag that it is still inflating at the time it contacts the child.

Further, air bags are typically folded and stored so that the central portion of the air bag inflates first and moves away from the inflator assembly in a direction toward the vehicle occupant. A vehicle occupant may be close enough to the air bag at the time of actuation of the inflator assembly that he or she contacts the air bag prior to full inflation of the air bag. The occupant is then likely to be contacted by the inflating central portion of the air bag. When this happens, the air bag continues to inflate around the occupant, and the force of the inflating air bag is imparted to the occupant.

Accordingly, it is desirable to inflate an air bag so as to minimize injury to an out of position vehicle occupant caused by an inflating air bag.

SUMMARY OF THE INVENTION

The present invention is an inflatable air bag for, when inflated by an inflator assembly, restraining an occupant of a vehicle. The air bag has a deflated, folded condition and an inflated, unfolded condition. When in the folded condition, the air bag has a plurality of folded portions disposed in a stack adjacent to the inflator assembly. The air bag has means for moving an out of position vehicle occupant sideways in the vehicle prior to full inflation of the air bag. The occupant moving means includes a first folded portion of the air bag disposed in an outer portion of the stack furthest from the inflator assembly and closest to the occupant when the air bag is in its folded condition.

In a preferred embodiment of the invention, the first folded portion of the air bag is a flap portion pivotally connected with the stack of folded air bag portions at one side of the stack. As the air bag inflates, the flap portion inflates first and pivots sideways as it moves outwardly from the stack. Thus, the first portion of the inflating air bag which an out of position vehicle occupant contacts is a portion which is moving sideways. The pivoting portion of the air bag moves the out of position vehicle occupant off to one side of the inflating air bag, out of the direct path of inflation of the air bag, and the remainder of the air bag inflates away from the out of position occupant. As a result, the out of position vehicle occupant does not receive the full force of the inflating air bag.

BRIEF DESCRIPTION OF THE DRAWINGS

The foregoing and other features of the present invention will become apparent to one of ordinary skill in the art to which the present invention pertains upon a consideration of the following description of the invention with reference to the accompanying drawings, wherein:

FIG. 1 is a schematic illustration of an air bag folded in accordance with the present invention;

FIG. 2 is a schematic illustration generally similar to FIG. 1 and depicting partial inflation of the air bag of FIG. 1;

FIGS. 3 through 6 are a series of views of the air bag of FIG. 1 illustrating the folding of the air bag in accordance with the present invention;

DESCRIPTION OF A PREFERRED EMBODIMENT OF THE INVENTION

Figure 7:
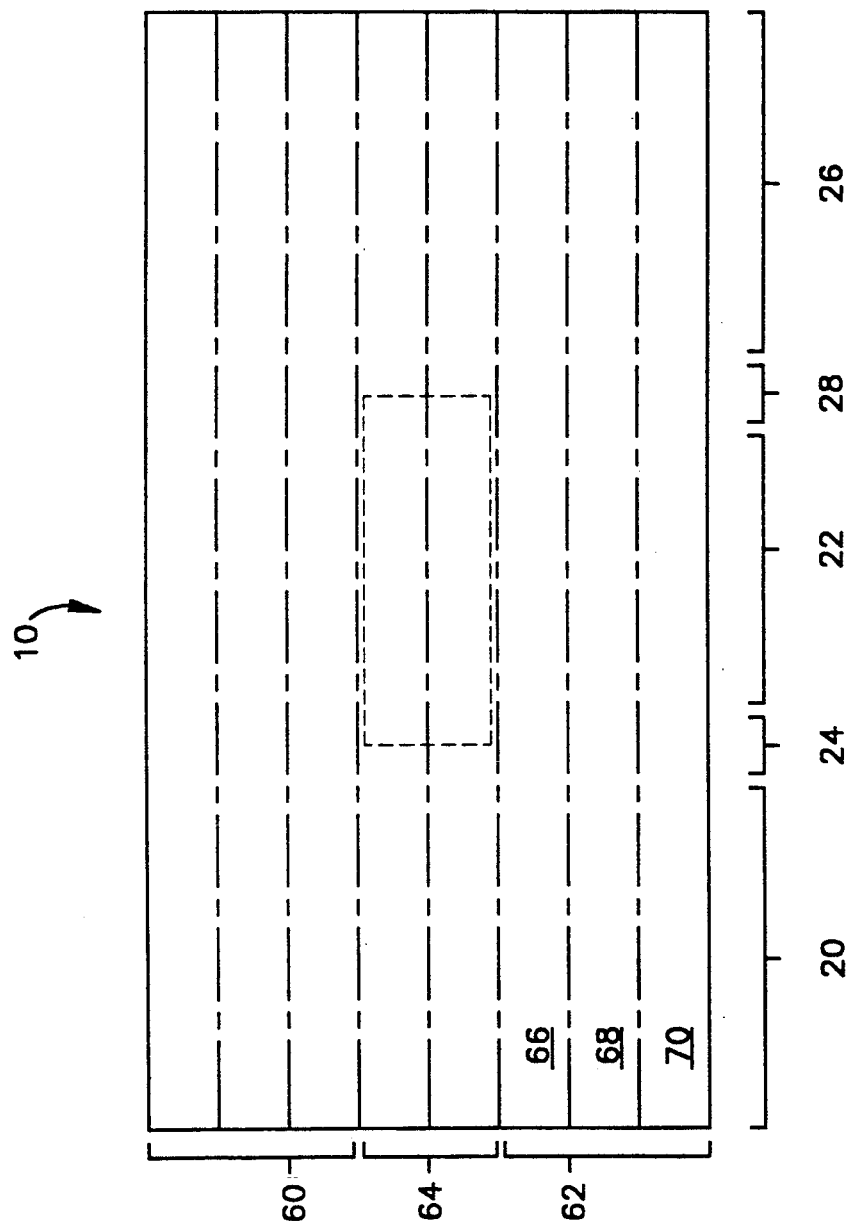
FIG. 7 is a plan view of the air bag of FIG. 1 in a deflated condition and prior to folding.

The present invention relates to an air bag for, upon inflation, restraining movement of a vehicle occupant during a collision. More particularly, the present invention relates to an air bag for moving an out of position vehicle occupant sideways in the vehicle prior to full inflation of the air bag.

As representative of the present invention, FIG. 1 illustrates schematically an air bag 10 supported in the instrument panel of a vehicle (not shown) and for restraining movement of a passenger 12 located in the right front seating position of the vehicle. Upon the occurrence of sudden vehicle deceleration such as occurs in a collision, an inflator assembly 14 in the vehicle instrument panel is actuated in a known manner to direct high pressure gas rapidly into the air bag 10. The air bag 10 inflates to restrain forward movement of the vehicle occupant 12, that is, movement toward the inflator 14 as viewed in FIG. 1.

Prior to being stored in the vehicle instrument panel, the deflated air bag 10 is folded in the manner illustrated schematically in FIGS. 3-6. As seen in FIG. 3, the unfolded air bag 10 includes a first flap portion 20 connected with a laterally central portion 22 of the air bag by a first connector portion 24. The air bag 10 also includes a second flap portion 26 connected with the laterally central portion 22 by a second connector portion 28. Each portion of the air bag 10 described herein is two layers of fabric which define between them an inflation volume into which gas from the inflator 14 is directed to inflate the air bag. It should also be understood that the various portions of the air bag 10 are contiguous areas of air bag fabric which become identifiable as portions separate from each other upon folding of the fabric as described herein.

The air bag 10 is first folded along the second connector portion 28 so that the second flap portion 26 overlies the laterally central portion 22, as seen in FIG. 4. The second flap portion 26 may then optionally be folded back along a connector portion 30 so that an end portion 32 of the second flap portion overlies the remainder of the second flap portion. This may be done if, for example, the air bag 10 is mounted off center relative to the inflator 14, and there is more material of the air bag in the second flap portion 26 than in the first flap portion 20. It should be understood that this optional folding of the air bag 10 is no always needed and that the present invention specifically includes an air bag which does not have this optional fold.

The air bag 10 is then folded along the first connector portion 24 so that the first flap portion 20 overlies the second flap portion 26, as seen in FIG. 6. The air bag 10 is then in the folded condition shown schematically in FIG. 1.

The folded portions of the air bag 10 are disposed in a stack 34 adjacent to the inflator assembly 14. The first connector portion 24 is disposed at a first lateral side 36 of the stack 34. The first flap portion 20 is in the stack 34 furthest from the inflator assembly 14 and closest to the vehicle occupant. The first flap portion 20 extends laterally across the stack 34 from the first connector portion 24 for substantially the entire lateral extent of the stack. When the air bag 10 is fully inflated, the first flap portion 20 forms a first lateral side area of the air bag disposed furthest to the right as viewed in FIGS. 1 and 2.

The second connector portion 28 of the air bag 10 is disposed at a second lateral side 38 of the stack 34. The second flap portion 26 is disposed in the stack closer to the inflator assembly 14 and further from the vehicle occupant 12 than the first flap portion 20. The second flap portion 26 extends laterally across the stack 34 from the second connector portion 28 for substantially the entire lateral extent of the stack. When the air bag 10 is fully inflated, the second flap portion 20 forms a second lateral side area of the air bag 10 disposed furthest to the left as viewed in FIGS. 1 and 2.

The laterally central portion 22 of the air bag 10 is disposed in the stack 34 closest to the inflator assembly 14 and furthest from the vehicle occupant 12. When the air bag 10 is fully inflated, the laterally central portion 22 of the air bag forms a laterally central area of the air bag 10 disposed intermediate the first and second lateral side areas of the air bag.

In the event of sudden vehicle deceleration such as occurs in a collision, the vehicle occupant 12 (FIG. 1) begins to move forward relative to the air bag 10, that is, toward the inflator assembly 14 as viewed in FIGS. 1 and 2. The inflator assembly 14 is actuated in a known manner to direct high pressure gas into the air bag 10 to inflate the air bag.

The portion of the air bag 10 which inflates first is the first flap portion 20. As it inflates, the first flap portion 20 pivots outwardly and sideways about the first connector portion 24 in the direction indicated by the arrow 42 (FIG. 2). The first flap portion 20 is therefore the first portion of the air bag 10 which contacts the vehicle occupant 12.

Because it moves both outwardly and sideways as it is inflated, the first flap portion 20 tends to move an out of position occupant sideways in the vehicle. In other words, the occupant is moved away from the lateral center line 40 of the air bag 10 in a direction indicated by the arrow 44. As the first flap portion 20 continues to inflate past the condition shown in FIG. 2, it continues to move in the direction indicated by the arrow 42. This movement pushes the occupant 12 farther off to the side of the inflating air bag 10. The first flap portion 20 stays in contact with the occupant 12 during inflation of the air bag 10 and does not slide off. Because the flap portion 20 does not slide off the occupant 12, the air bag 10 does not allow the out of position occupant to be contacted by other portions of the inflating air bag.

As described above, the out of position vehicle occupant 12 is moved sideways in the vehicle prior to full inflation of the air bag 10. Accordingly, the remainder of the inflating air bag 10, including the laterally central portion 20, inflates off to one side of the out of position occupant 12. The bulk of the inflating air bag 10, and the bulk of the force generated by the air bag, are thus directed off to the side of the out of position occupant 12, instead of against the out of position occupant. This tends to minimize the possibility of injury to the out of position occupant 12 by the inflating air bag. Further, the first flap portion 20, as it contacts the out of position vehicle occupant 12, is moving in a direction oblique to the occupant's line of forward movement in the vehicle. This reduces the effective level of impact load on the occupant as compared to the impact load resulting from contact with an air bag inflating in a direction directly opposite to an occupant's path of forward movement.

As the air bag 10 continues to inflate past the condition shown in FIG. 2, the next portion of the air bag 10 to inflate is the second flap portion 26 (with or without the optional fold at 30). The second flap portion 26, as it inflates, pivots about the second connector portion 28 in a direction opposite to the direction of movement of the first flap portion 24.

If a vehicle occupant is, at the time of actuation of the inflator assembly 14, far enough away from the folded air bag 10 so that the flap portions 20 and 26 inflate without contacting the occupant, then the occupant is contacted by the laterally central portion 22 of the air bag. In this case, it is likely that the occupant is close to or in the desired position i.e., close to or against the vehicle seat back. The occupant 12 contacts a fully or substantially fully inflated air bag 10, and the risk of injury to the occupant from the inflating air bag is at its lowest level. Thus, the air bag 10, although it is folded in the particular manner shown in order to minimize injury to an out of position vehicle occupant, is also effective to restrain movement of a vehicle occupant who is not out of position.

Figure 11:
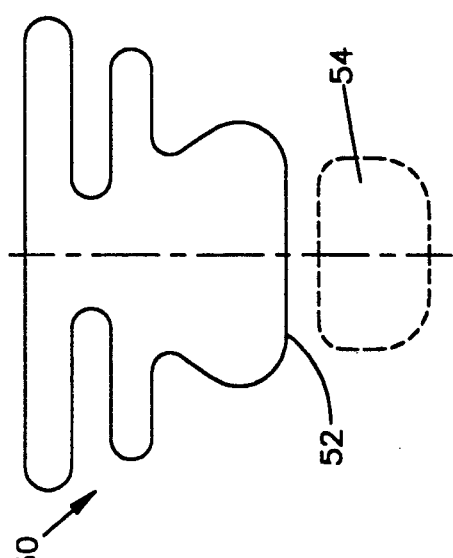
FIG. 11 is a schematic illustration depicting inflation of a prior art air bag which was folded and stored in a known manner.

For minimizing injury to an out of position vehicle occupant arising from inflation of an air bag, the air bag 10 has advantages as compared to, for example, an air bag such as the prior art air bag 50 illustrated schematically in FIG. 11. The prior art air bag 50 is folded with an "accordion" fold. The air bag 50 has a laterally central portion 52 which unfolds and inflates first and which is the portion of the air bag contacted by the vehicle occupant 54. The vehicle occupant 54 remains in the direct path of the inflating air bag 50 and is not moved off to the side of the inflating air bag. Also, the air bag portion 52 is moving rapidly in a direction directly opposite to the occupant's path of movement in the vehicle. Thus, the occupant 54 receives the full force of the inflating air bag 50. This increases the effective level of impact load between the vehicle occupant 54 and the air bag 50, as compared with the impact load resulting from occupant contact with the air bag 10 of the present invention.

Prior to being folded side-to-side as illustrated in FIGS. 3-6, the air bag 10 is first folded top-to-bottom, preferably in the manner illustrated schematically in FIGS. 7-10. The air bag 10 (FIG. 7) has upper and lower portions 60 and 62 which are mirror images of each other. A central portion 64 of the air bag 10 interconnects the upper and lower portions 60 and 62. The lower portion 62 of the air bag 10 includes contiguous sections 66, 68 and 70.

Figure 10:
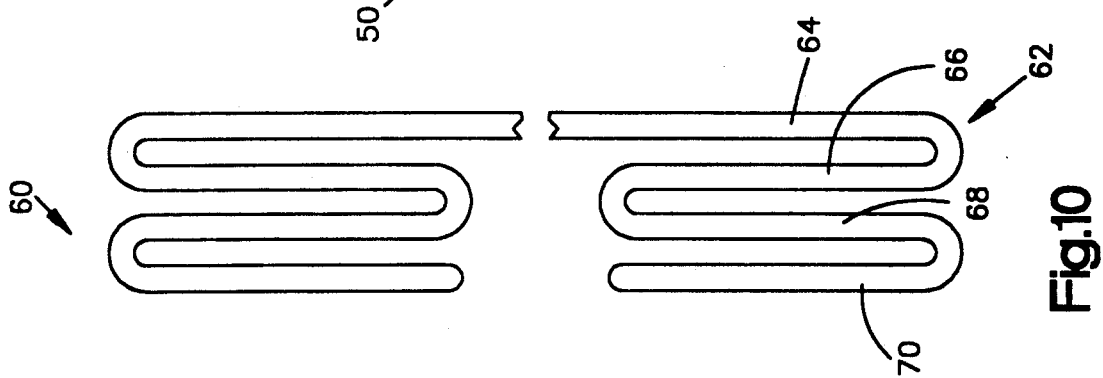
FIGS. 8 through 10 are a series of schematic side views of portions of the air bag of FIG. 1 in a deflated condition, illustrating the top to bottom folding of the air bag.
Figure 9:
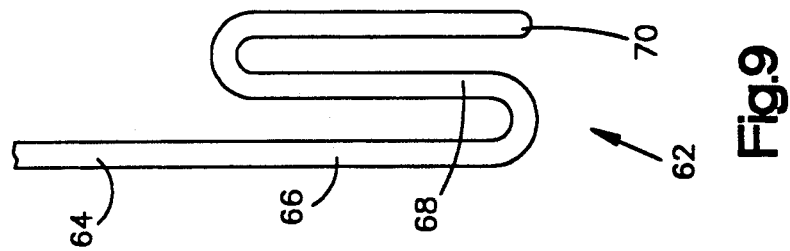
Figure 8:
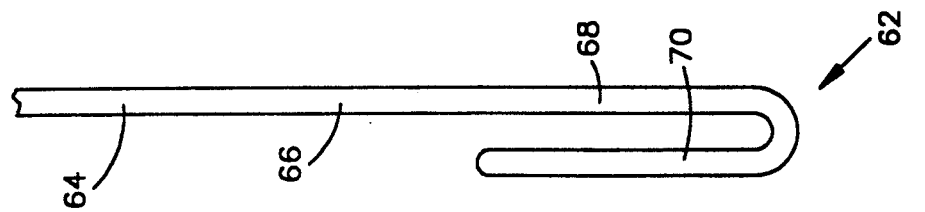

The air bag lower portion 62 (FIGS. 8 and 9) is first folded so that the section 70 overlies the section 68, as shown in FIG. 8. The lower portion 62 is then folded back so that the section 66 overlies the section 68 and the section 70, as shown in FIG. 9. Finally, the air bag portion 62 is folded so that the section 66 overlies the central portion 64, as shown in FIG. 10. The upper portion 60 of the air bag 10 is folded in a similar manner. The air bag 10 can then be folded side-to-side as illustrated in FIGS. 3-6. It should be understood that other top-to-bottom folding patterns may be used in an air bag 10 folded in accordance with the present invention.

From the above description of the invention, those skilled in the art will perceive improvements, changes and modifications in the invention. Such improvements, changes and modifications within the skill of the art are intended to be covered by the appended claims.

I claim:

1. An inflatable air bag for, when inflated by an inflator assembly, restraining an occupant of a vehicle,
    said air bag having a deflated, folded condition and an inflated, unfolded condition for restraining a vehicle occupant,
    said air bag having an inflation fluid receiving opening for receiving inflation fluid from the inflator assembly to inflate said air bag,
    said air bag when in the folded condition having a plurality of folded portions disposed in a stack adjacent to the inflator assembly, said folded portions including means for moving an out of position occupant sideways in the vehicle prior to full inflation of said air bag, said means for moving an out of position occupant comprising a first flap portion of said air bag and means for connecting said first flap portion of said air bag for sideways pivotal movement relative to the stack during inflation of said air bag to move said first flap portion of said air bag sideways in the vehicle across a lateral centerline of the stack with sufficient force to move an out of position vehicle occupant sideways during inflation of said air bag,
    said first flap portion being disposed in an outer portion of the stack furthest from the inflator assembly and closest to the occupant,
    said air bag having a first portion which is the first portion of said air bag to inflate into the unfolded condition for restraining a vehicle occupant, said first lap portion comprising said first portion,
    said air bag having surfaces defining a first inflation fluid flow path extending from the inflation fluid receiving opening to said first flap portion of said air bag, said surfaces defining said first inflation fluid flow path and defining only one 180° directional change for said inflation fluid as said air bag is inflated from the deflated, folded condition into the unfolded condition.

2. An inflatable air bag as set forth in claim 1 wherein said plurality of folded portions includes a laterally central portion of said air bag, said first flap portion being pivotally connected with said laterally central portion of said air bag at a first lateral side of said stack, said laterally central portion of said air bag being disposed closest to the inflator assembly and furthest from the occupant when said air bag is in the folded condition.

3. An inflatable air bag as set forth in claim 1 wherein said air bag when in the inflated, unfolded condition has a laterally central area and two lateral side areas spaced apart on opposite sides of said laterally central area, said air bag when in the deflated, folded condition having a plurality of folded portions disposed in the stack adjacent to the inflator assembly including (i) said outer portion disposed in the stack furthest from the inflator assembly and closest to the occupant and forming one of said first and second lateral side areas of said air bag when said air bag is in the inflated condition, said first flap portion forming said outer portion, and (ii) an inner portion disposed in the stack closer to the inflator assembly than said outer portion and furthest from the occupant and forming said laterally central area of said air bag when said air bag is in the inflated condition.

4. An inflatable air bag for, when inflated by an inflator assembly, restraining an occupant of a vehicle,
    said air bag having a deflated, folded condition and an inflated, unfolded condition for restraining a vehicle occupant,
    said air bag having an inflation fluid receiving opening for receiving inflation fluid from the inflator assembly to inflate said air bag,
    said air bag when in the folded condition having a plurality of folded portions disposed in a stack adjacent to the inflator assembly, said folded portions including means for moving an out of position occupant sideways in the vehicle prior to full inflation of said air bag, said means for moving an out of position occupant comprising a first flap portion of said air bag and means for connecting said first flap portion of said air bag for pivotal movement relative to the stack during inflation of said air bag to move said first flap portion of said air bag sideways in the vehicle with sufficient force to move an out of position vehicle occupant sideways during inflation of said air bag,
    said first flap portion being disposed in an outer portion of the stack furthest from the inflator assembly and closest to the occupant,
    said air bag having a first portion which is the first portion of said air bag to inflate into the unfolded condition for restraining a vehicle occupant, said first flap portion comprising said first portion,
    said air bag having surfaces defining a first inflation fluid flow path extending from the inflation fluid receiving opening to said first flap portion of said air bag, said surfaces defining said first inflation fluid flow path and defining only one 180° directional change for said inflation fluid as said air bag is inflated from the deflated, folded condition into the unfolded condition;

said plurality of folded portions including a second flap portion disposed in the stack closer to the inflator assembly than said first flap portion and further from the occupant than said first flap portion when said air bag is in the folded condition, said air bag having surfaces defining a second inflation fluid flow path extending from the inflation fluid receiving opening to said second flap portion of said air bag and defining only one 180° directional change for said inflation fluid as said air bag is inflated from the deflated, folded condition.

5. An inflatable air bag as set forth in claim 4 wherein said second flap portion of said air bag is pivotally connected with a laterally central portion of said air bag at a lateral side of said stack.

* * * * *